United States Patent [19]

Okada

[11] Patent Number: 4,964,589
[45] Date of Patent: Oct. 23, 1990

[54] MODE CHANGING MECHANISM FOR A TAPE PLAYER

[75] Inventor: Hitoshi Okada, Tokyo, Japan

[73] Assignee: Clarion Co., Ltd., Tokyo, Japan

[21] Appl. No.: 348,043

[22] Filed: May 5, 1989

[30] Foreign Application Priority Data

May 17, 1988 [JP] Japan .................. 63-118381

[51] Int. Cl.⁵ ................ G11B 15/18; B65H 20/36
[52] U.S. Cl. ................ 242/201; 242/200; 360/96.3; 360/96.4
[58] Field of Search .......... 242/200, 201, 202, 203, 242/204; 360/96.1, 96.2, 96.3, 96.4

[56] References Cited

U.S. PATENT DOCUMENTS

| | | | |
|---|---|---|---|
| 3,938,758 | 2/1976 | Totino | 242/201 |
| 4,102,517 | 7/1978 | Cicatelli | 242/201 |
| 4,260,120 | 4/1981 | Urata et al. | 242/201 |
| 4,711,410 | 12/1983 | Gwon | 242/201 |

Primary Examiner—Stuart S. Levy
Assistant Examiner—Steven M. duBois
Attorney, Agent, or Firm—Wallenstein, Wagner & Hattis, Ltd.

[57] ABSTRACT

A tape unloading mechanism which includes a frictional arrangment for adjusting torque of reel bases is configured to interrupt a frictional motion of the frictional arrangment in the tape unloading mode to ensure a reliable tape winding operation.

3 Claims, 3 Drawing Sheets

MODE CHANGING MECHANISM FOR A TAPE PLAYER

FIELD OF THE INVENTION

This invention relates to a magnetic recording apparatus using a tape as a recording medium, and more particularly to a tape unloading mechanism for effecting tape unloading in a digital audio player or VTR of a type configured to wind a tape on a rotary head to effect various modes.

BACKGROUND OF THE INVENTION

In a magnetic recording apparatus using a tape in general, the driving power of a capstan motor is transmitted to a take-up reel base via a gear to rotate the take-up reel base to wind up (advance) the tape. In this connection, the reel base is provided with a gear in an integral form, and the rotating speed of the reel base is changed by changing the number of revolutions of the capstan motor. More specifically, the capstan motor is rotated at a low speed in the play mode (normal play) to rotate the reel base at a low speed, and it is rotated at a high speed in the fast winding mode to rotate the reel base at a high speed.

In order to not only maintain the torque applied to the tape in a constant value but also absorb variations in the number of revolutions of a reel caused by changes in the take-up diameter in the play mode, the above-indicated magnetic recording apparatus includes a friction gear positioned between the capstan motor and the reel bases to effect a frictional motion. In the fast winding mode, the frictional motion is withheld because the tape must be wound under a greater torque than in the play mode.

On the other hand, in a digital audio player, VTR or other apparatus of a type configured to wind a tape on a rotary head to effect various modes, tape unloading is effected using a gear arrangement from the capstan motor to the reel base as described above. More specifically, the rotating power of the capstan motor is transmitted to a supply reel base via the friction gear in the tape unloading mode, so as to rotate the supply reel base in the opposite direction to the direction in the play mode to wind up the tape. In this case, the take-up reel base is held in a braked condition..

However, in case that tape unloading is effected by using the gear arrangement from the capstan motor to the reel base as described above, since the friction gear exists midway of the gear arrangement, there is a possibility that the frictional motion of the friction gear decreases the take-up torque and disables complete tape unloading.

OBJECT OF THE INVENTION

It is therefore an object of the invention to provide a tape unloading mechanism capable of reliably winding up the tape in the tape unloading mode.

SUMMARY OF THE INVENTION

An inventive tape unloading mechanism comprises a power source; friction means located between the power source and reel bases to adjust the torque of the reel bases; and friction interrupting means for stopping a frictional motion of the friction means in the tape unloading mode to fix it at a position for an integral motion.

In the above-indicated inventive arrangement, since the friction means can effect an integral motion in the tape unloading mode, the tape can be wound up under a sufficient torque, without decreasing the take-up torque. Therefore, short-winding never occurs and a reliable tape unloading is ensured.

BRIEF DESCRIPTION OF THE DRAWINGS

FIG. 1 is a plan view thereof in the play mode;
FIG. 2 is a plan view thereof in the tape unloading mode;
and
FIG. 3 is a cross-sectional view showing how gears are connected.

DETAILED DESCRIPTION

Figure 1:
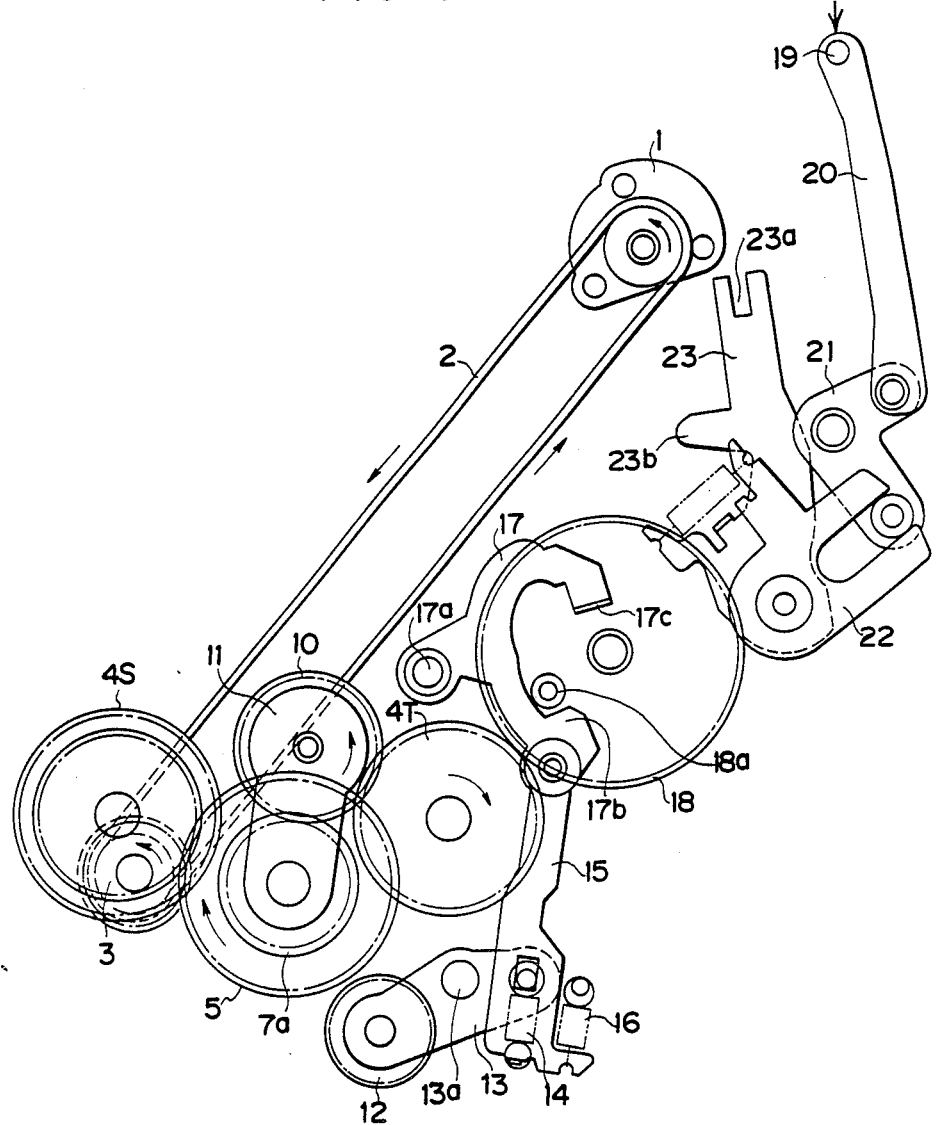
FIGS. 1 to 3 show an embodiment of the invention.

The invention is described below in detail, referring to an embodiment illustrated in the drawings.

As shown in FIG. 1, driving power of a capstan motor 1 employed as a power source is transmitted to a pulley 3 via a belt 2. The pulley 3 has a gear which always engages a friction gear assembly (friction means) 5 located between a take-up reel base 4T and a supply reel base 4S.

Figure 3:
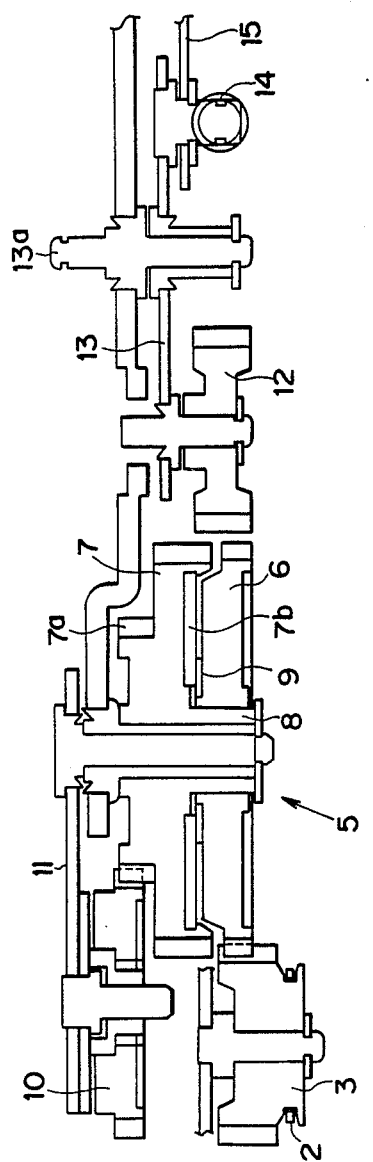

As shown in FIG. 3, the friction gear assembly 5 consists of a drive-side gear 6 and a follow-side gear 7 which have the same module and the same number of teeth. The drive-side gear 6 is located under the follow-side gear 7 and is mounted on a shaft 8 formed in a unitary body with the follow-side gear 7. Here, a resin-made spacer 9 is inserted between the drive-side gear 6 and the follow-side gear 7 to provide a certain gap between them. The drive-side gear 6 is a magnet gear, and the follow-side gear 7 includes an integral hiss plate 7b. The drive-side gear 6 always engages the pulley 3, and a small-diameter gear 7a of the follow-side gear 7 always engages an idler gear 10. The idler gear 10 is mounted at the top of an idler arm 11 which is coaxially rotatable with the follow-side gear 7. The idler arm 11 has a predetermined friction between the follow-side gear 7 and itself, so that it rotates in the rotating direction of the follow-side gear 7 into engagement with one of the take-up reel base 4T and the supply reel base 4S, as shown in FIG. 1.

The embodiment uses a fast-winding gear 12 provided near the friction gear 5 as friction interrupting means for cancelling friction in the tape unloading mode. Teeth of the fast-winding gear 12 are brought into the entire friction gear 5, i.e., both the drive-side gear 6 and the follow-side gear 7 in the tape unloading mode. In this case, the fast-winding gear 12, which is in close contact and engagement with the friction gear 5, transmits the driving power of the capstan motor, without slippage to the take-up reel base 4T or the supply reel base 4S. A specific arrangement of the fast-winding gear 12 is as follows. The fast-winding gear 12 is mounted at one end of a fast-winding gear plate 13 which is pivotably mounted by a shaft 13a. The fast-winding plate 13 is linked to a fast-winding link 15 via a fast-winding gear pressing spring 14, and it is controlled in a direction for bringing the fast-winding gear 12 away from the friction gear 5 (counterclockwisely in the drawing) when the fast-winding link 15 is in a front, return position (upper position in the drawing) as shown in FIG. 1 and controlled in a direction for bringing the fast-winding gear 12 into close contact with the friction gear 5 (clockwisely in the drawing) when the fast-winding link 15 is in a rear, fast-winding position (lower position in the drawing). The fast-winding gear link 15 is always biased toward the front, return position by a fast-winding gear returning spring 16.

Figure 2:
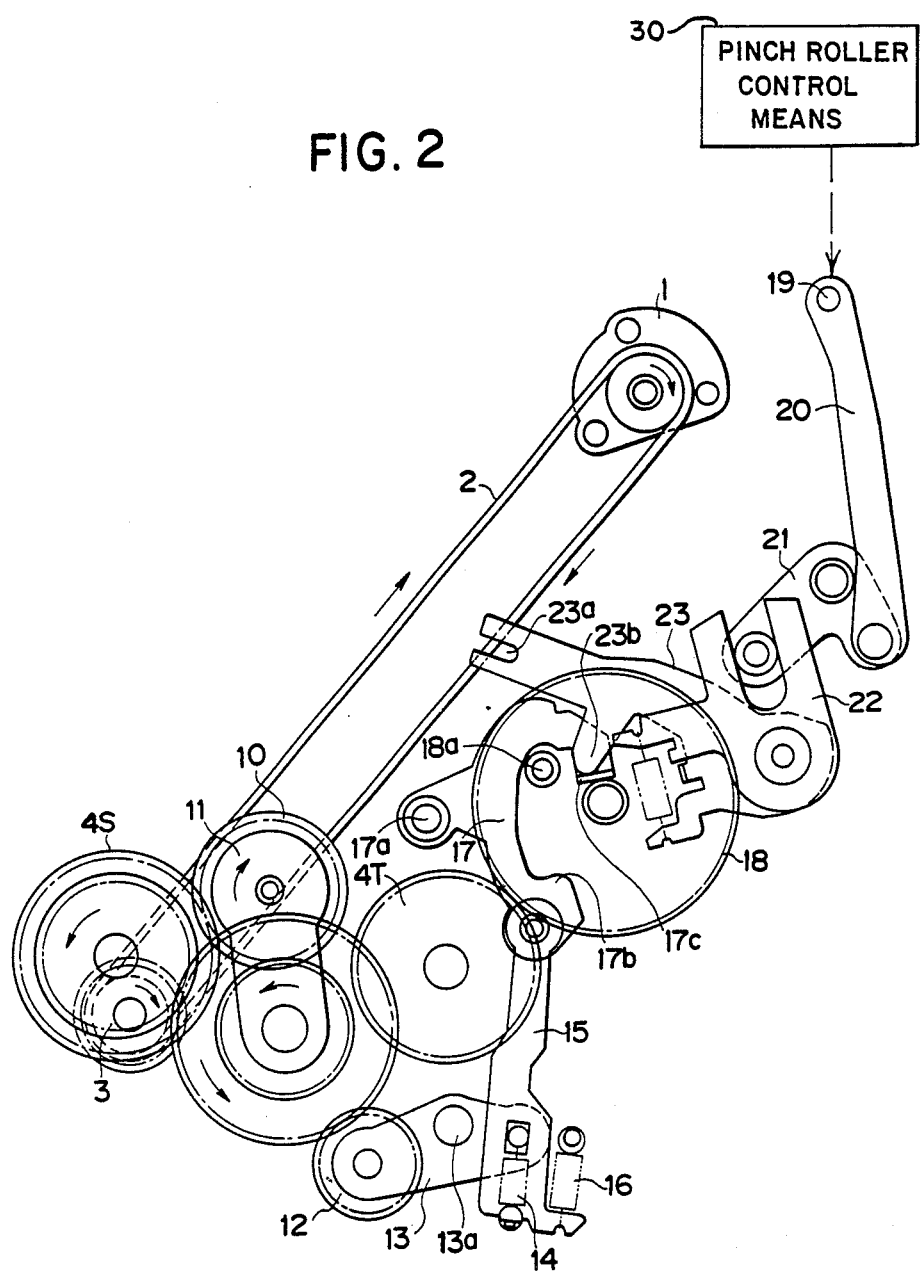

Further, as means for positionally controlling the fast-winding link 15 to bring the fast-winding gear 12 into close contact with the friction gear 5, two kinds of means are provided via a fast-winding arm 17. The fast-winding arm 17 is mounted pivotably by a shaft 17a, and as shown in FIGS. 1 and 2, it is pivotably connected to the other end of the fast-winding link 15 opposite to the said end thereof supporting the fast-winding gear plate 13. As means for bringing the fast-winding gear into close contact in the fast winding mode, a pin 18a is provided on a mode-changing cam gear 18. A fast-forwarding engaging portion 17b of the fast-winding arm 17 is urged and pivoted by the pin 18a in the clockwise direction in the drawing so as to move the fast-winding link 15 to the rear, fast-winding position to bring the fast-winding gear 12 into close contact with the friction gear 5. As means for establishing close contact of the fast-winding gear 12 in the tape unloading mode, a pinch roller arm driving source (control means 30) for driving a pinch roller arm is used. The pinch roller arm driving source engages an engaging portion 19 which reciprocates back and forth in the play mode and in the tape unloading mode to rotate a pinch lever 23 in the same direction via three links 20 to 22. More specifically, in the play mode as shown in FIG. 1, the engaging portion 19 for engaging the pinch roller arm driving source 30 moves to an advanced position (upper position in the drawings), the pinch lever 23 is pivoted to the advanced position via the three links 20 to 22, and the pinch roller arm (not shown) connected to an engaging portion 23a at the top is moved to the play position. In the tape unloading mode, the engaging portion 19 for engagement with the pinch roller arm driving 30 source moves to the return position (lower position in the drawing), and the pinch lever 23 is pivoted toward the rear, return position. During such a pivotal motion toward the return position, an urging portion 23b of the pinch lever 19 engages a tape unloading engaging portion 17c of the fast-winding arm 17 at a position slightly before the position for fully returning the pinch roller arm as shown in FIG. 2, and brings the fast-winding gear 12 into meshing engagement with the friction gear 5 via the fast-winding link 15.

The tape unloading mechanism according to the embodiment having the above-described construction operates as explained below.

In the play mode, as shown in FIG. 1, under the driving power of the capstan motor 1, the pulley 3 rotates counterclockwisely, the friction gear 5 rotates clockwisely, and the idler gear 10 rotates counterclockwisely. In this case, since the idler arm 11 pivots to the right in the drawing, following the rotating direction of the friction gear 5, the idler gear 10 engages the take-up reel base 4T. As a result, the take-up reel base 4T rotates in the clockwise direction which is the take-up direction, and the tape is wound up. It is noted that in the play mode shown in FIG. 1, the fast-winding arm 17 is free from the pin 18a of the cam gear 18 and from the urging portion 23b of the pinch lever 23, and the fast-winding link 15 connected to the fast-winding arm 17 is located at the front, return position by the fast-winding gear returning spring 16 so as to locate the fast-winding gear 12 apart from the friction gear 5.

In the tape unloading mode, as shown in FIG. 2, the engaging portion 19 for engagement with the pinch roller arm driving source moves to the return position (lower position in the drawing), and the pinch lever 23 pivots toward the rear, return position. Further, the take-up reel base 4T is braked. In this condition, under the driving power of the capstan motor 1, the pulley 3 rotates in the clockwise direction opposite to the direction in the play mode, the friction gear 5 rotates counterclockwisely, and the idler gear rotates clockwisely. In this case, since the idler gear arm 11 pivots to the left in the drawing, following the rotating direction of the friction gear 5, the idler gear 10 engages the supply reel base 4S. As a result, the supply reel base 4S rotates in the counterclockwise direction which is the take up direction, and the tape is rewound. At this stage, the fast-winding gear 12 does not yet engage the friction gear 5, and a frictional function occurs between the drive-side gear 6 and the follow-side gear 7 of the friction gear 5.

On the other hand, the pinch lever 23 which is in the return motion as explained above reaches a position slightly before the position for fully returning the pinch roller arm, the pinch lever 23, as shown in FIG. 2, contacts at its urging portion with the tape unloading engaging portion 17c of the fast-winding arm 17 to move the fast-winding link 15 to the fast-winding position and bring the fast-winding gear 12 in engagement with the friction gear 5. As a result, the drive-side gear 6 and the follow-side gear 7 which construct the friction gear 5 both engage the fast-winding gear 12 and rotate integrally. Therefore, in the last stroke of the transition to tape unloading operation, the supply reel base 4S can reliably wind up the tape under no frictional motion. More specifically, in the prior art, it may occurs that the take-up torque decreases because of a frictional motion of the friction gear, and this disables a complete tape unloading. In contrast, the above-described embodiment overcomes this problem and ensures a complete tape unloading.

Beside this, in the fast-winding mode, the mode changing cam gear 18 is driven counterclockwisely from the condition of FIG. 1, so that the pin 18a provided thereon engages the fast-winding engaging portion 17b of the fast-winding arm 17 to cause the fast-winding link 15 to move to the fast-winding position and cause the fast-winding gear 12 to engage the friction gear 5.

The invention is not limited to the aforementioned embodiment, but driving means and linkage arrangement for establishing close contact between the fast-winding gear and the friction gear may be freely chosen. Further, the means for interrupting the friction in the tape unloading mode is not limited to the fast-winding gear, but it may be arranged to press the drive-side gear and the follow-side gear in up and down directions into engagement so as to establish their integral motion.

As described above, in the inventive tape unloading mechanism, because the friction interrupting means for interrupting the frictional motion of the friction means and fixing it at a position establishing an integral motion is used, the friction means can effect an integral motion in the tape unloading mode. Therefore, a decrease in the take-up torque which is a problem in the prior art is overcome, and a tape is wound up under a sufficient torque. Therefore, the invention ensures a complete tape unloading, not causing a short-winding.

What is claimed is:

1. A tape drive mechanism comprising:

a driving source coupled to drive supply and take-up reelbases in normal play and rewind modes;

pinch roller control means including a pivotally mounted pinch roller control member for operating a capstan pinch roller between engaged and disengaged positions;

friction slippage means disposed between said driving source and said reelbases to control the torque delivered to said reelbases;

slippage disabling means for preventing frictional slippage of said friction slippage means in the tape unloading and fast-winding mode, said friction slippage means including a first gear coupled to said driving source, a second gear isolated by a predetermined distance from and disposed coaxially with said first gear, a coaxially mounted friction slippage element frictionally coupling said gears to rotate together, a fast-winding gear configured for simultaneous meshing engagement with said first and second gears, and an arm which is supported pivotally with respect to a base board to rotate responsively to a pivotal movement of said pinch roller control member, said fast-winding gear being supported at an end of said arm to simultaneously engage with or disengage from said first and second gears according to the position of said pinch roller member, said driving source including means for selectively driving said supply and take-up reelbases from said second gear; and rotatably mounted mode changing means, said arm being also responsively coupled to rotation of said mode changing means to controllably mesh said fast-winding gear with said first and second gears.

2. The tape drive mechanism of claim 1 wherein said mode changing means is coupled to said arm so that in a first rotary position of said mode changing means said fast-winding gear is carried into engagement with said first and second gears for fast-winding and so that in a second rotary position of said mode changing means said fast-winding gear is withdrawn form such engagement for normal play.

3. The tape drive mechanism of claim 2 wherein said pinch roller control member is coupled to said arm so that in when said pinch roller is disengaged from said capstan said fast-winding gear is carried into engagement with said first and second gears for fast winding and so that when said pinch roller is engaged with said capstan said fast-winding gear is withdrawn from such engagement for normal play.

* * * * *